(No Model.) 2 Sheets—Sheet 1.
R. E. ROSE.
APPARATUS FOR TREATING PHOSPHATE ROCK.
No. 519,393. Patented May 8, 1894.
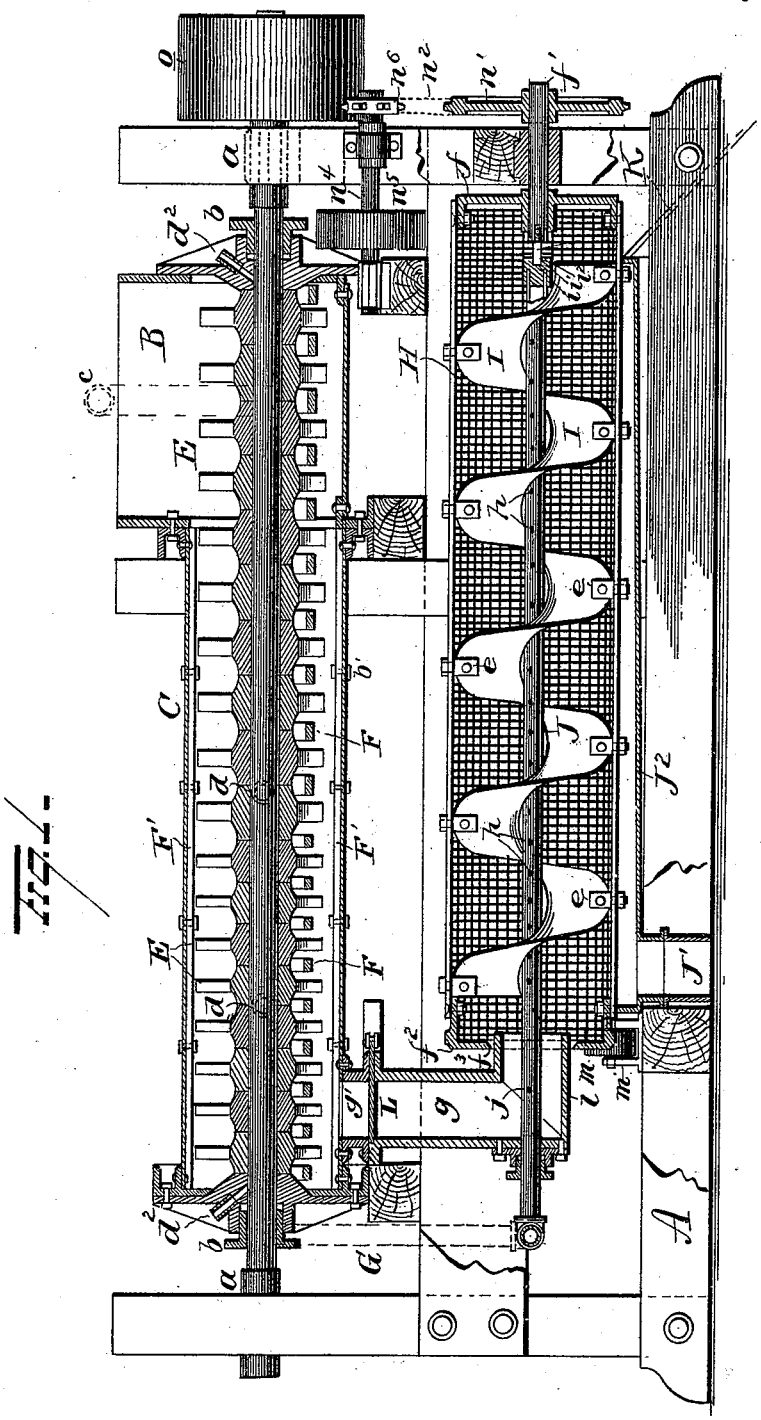

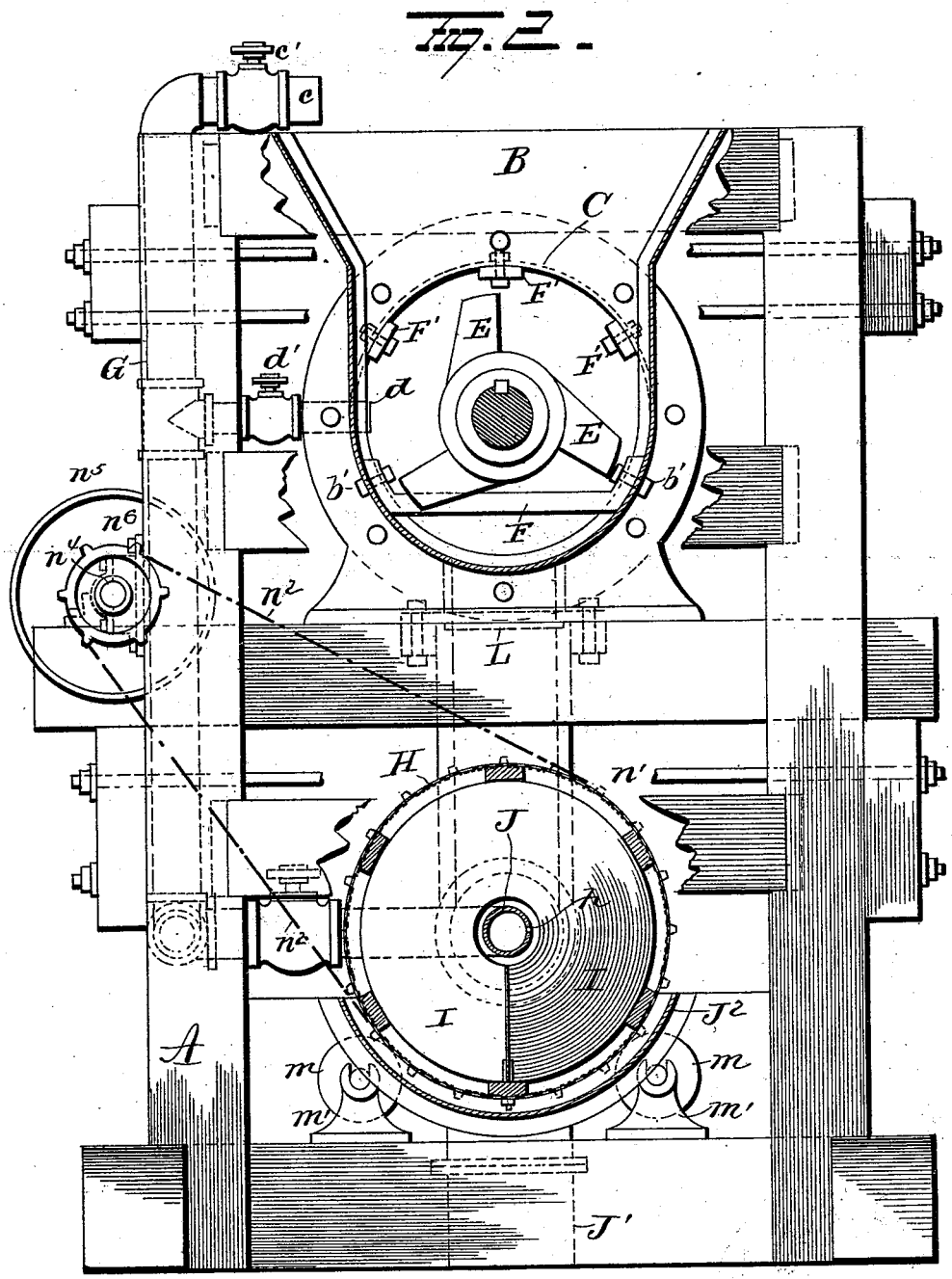

UNITED STATES PATENT OFFICE.

RUFUS E. ROSE, OF KISSIMMEE, FLORIDA.

APPARATUS FOR TREATING PHOSPHATE ROCK.

SPECIFICATION forming part of Letters Patent No. 519,393, dated May 8, 1894.

Application filed December 16, 1892. Serial No. 455,398. (No model.)

*To all whom it may concern:*

Be it known that I, RUFUS E. ROSE, of Kissimmee, in the county of Osceola and State of Florida, have invented certain new and useful Improvements in Apparatus for Treating Phosphate Rock; and I do hereby declare the following to be a full, clear, and exact description of the invention, such as will enable others skilled in the art to which it appertains to make and use the same.

My invention relates to an improvement in apparatus for washing and screening phosphate rock,—the object of the invention being to so construct the apparatus that its action shall be completely under the control of the operator.

A further object is to construct the apparatus in such manner that the mixed phosphate rock, clay and other foreign matter can be retained in the washing compartment of the apparatus until it shall have been thoroughly disintegrated, and so that the material may be made to escape from the agitating and washing compartment in proper quantities, according to its state of disintegration or the condititon of the washing compartment.

A further object is to provide simple and efficient means adapted to act in conjunction with the washer, for screening and rinsing the phosphate rock after it leaves the washer and agitator.

A further object is to improve the general construction of apparatus for cleansing phosphate rock, and to construct and arrange said apparatus that it shall be simple and effectual in the performance of its functions.

With these objects in view the invention consists in certain novel features of construction and combinations and arrangements of parts as hereinafter set forth and pointed out in the claim.

In the accompanying drawings, Figure 1 is a side elevation partly in section. Fig. 2 is an end elevation view partly in end elevation.

A represents a framework, on which a hopper B is located and also located on said framework and communicating at one end with said hopper is a cylinder C. A shaft D is mounted at its ends in suitable bearings $a$ on the framework and passes longitudinally through the hopper B and cylinder C. Where the shaft D passes through the end of the hopper and the end of the cylinder, packing glands $b$ are provided on the outside of the end of the hopper and cylinder respectively, whereby to prevent the wearing of the bearings of the shaft, which would likely occur if the bearings were on the inside of the hopper and cylinder and unprotected by glands, as the gritty material being treated would work its way between the shaft and its bearing and thus seriously affect both.

Secured to the shaft D within the hopper B and within the closed cylinder C and extending entirely through the same, is a series of beaters or agitators E, each comprising a series of arms, preferably three, as shown in Fig. 2.

Secured within the cylinder C by means of bolts $b'$, is a series of cross bars F, said cross bars being arranged below the shaft D and adapted to alternate with the beaters E so that the latter will operate between them. Similar cross bars are also located in the hopper B. From this arrangement it will be seen that the beaters E will act in conjunction with the cross bars F to disintegrate or separate the material in the hopper and cylinder, and the cross bars will also prevent the material rotating with the beaters. The cylinder C is also provided interiorly with a series of bars or ribs $F'$ running longitudinally thereof,—said bars or ribs serving to prevent the wearing away of the cylinder by the constant contact therewith of the material being treated, and also acting to retard the motion of the material near the interior wall of the cylinder or shell C.

A water supply pipe G is supported by the framework and adapted to communicate with any suitable source of supply, and with the water supply pipe, a spout $c$ communicates and is so arranged as to discharge water into the hopper B, a valve $c'$ being provided whereby to control the discharge of water through this spout. A series of pipes $d$ communicate at one end with the closed cylinder C at various points, and at their other ends said pipes communicate with the general supply pipe G, whereby water can be discharged into the cylinder at various points, to mix with and dissolve the soluble matter mixed with the phosphate rock. Each pipe $d$ is provided with a valve $d'$ whereby to control the flow of water through the same. Water tubes $d^2$ convey water to the shaft D in proximity to the packing and thus maintain the packing free from the material being operated upon.

Revolubly mounted in the framework A below the washer above described, is a screen H, which is built upon and secured to a spiral conveyer I,—said screen and spiral conveyer being preferably secured together by means of brackets $e$. The head $f$ of the screen H is fixed to a shaft $f'$ mounted in the framework A, and the other head $f^2$ of the screen is made with an opening $f^3$ for the reception of the end of a chute $g$,—the other end of said chute communicating with an opening $g'$ at or near the outer end of the cylinder C. Through this chute the material is adapted to pass from the cylinder C to the interior of the revoluble screen H. Passing through the center of the spiral conveyer I, is a pipe J having a series of perforations $h$ therein, as shown in Fig. 1. One head of the pipe J is closed as at $i$, said head being provided with a socket or recess $i'$, in which a journal $i^2$ loosely fits,—the other end of said journal being secured to the inner end of the shaft $f'$. Said pipe J extends, at its other end, through the lower end of the chute $g$, where it is perforated as at $j$, and is connected with the main supply pipe G.

In order to properly support the end of the revoluble screen in proximity to the chute $g$ and to relieve the laterally projecting arm $l$ of said chute, from the weight of the screen and its contents, two rollers or wheels $m$ are mounted in suitable brackets $m'$ on the framework and under the screen. On these rollers or wheels the end of the screen is adapted to run.

A hopper $J^2$, preferably of sheet metal is located under the screen H and adapted to receive screenings therefrom,—said hopper being arranged in an inclined position and at its lower end is provided with a chute $J'$ for the escape of the screenings and water from said hopper. A chute K is provided at the lower end of the screen whereby to conduct the washed phosphate rock which discharges through hole $k$ therefrom.

A sprocket wheel $n'$ is secured to the end of the shaft $f'$ and meshing with this sprocket wheel is a sprocket chain $n^2$, which also passes over a sprocket wheel $n^6$ carried by a shaft $n^4$. The shaft $n^4$ carries a pulley $n^5$, over which a belt (not shown) is adapted to pass, whereby to transmit motion thereto from any convenient source of power. The shaft D is also provided with a band wheel $o$, over which a band from any convenient source of power is adapted to pass, whereby to drive said shaft D.

In the chute $g$ a valve (preferably a slide valve) L is provided, and this feature of the apparatus is of considerable importance,—for by it, the operator can control the flow of the material from the washer to the screen, or he can retain the material within the closed cylinder C until it shall have become thoroughly separated or disintegrated.

The material,—viz. the mixed phosphate rock, clay, &c., is inserted into the hopper B where it will be broken up and separated by the beaters E, a sufficient quantity of water being permitted to flow into the hopper through the spout $c$. From the hopper B the material will pass into and through the cylinder C into which more water is run as previously explained. As the material passes through the closed cylinder C it will be thoroughly agitated and disintegrated by the beaters E, acting in conjunction with the cross bars F and ribs or bars F',—and said cylinder C being closed the shaft carrying the beaters can be revolved with great rapidity. When the mixture in the cylinder C shall have become sufficiently thinned by the water admitted thereto, and the soluble matter shall have been dissolved by the water and separated from the phosphate rock or pebbles, the operator will open the valve L more or less, to permit the contents of the cylinder to pass through the chute $g$ to the screen H. The material will be carried through the screen H by the spiral conveyer I, the water containing the clay, &c., in solution or in suspension escaping through the meshes of the screen. As the material passes through the screen it will be acted upon by clean water escaping in jets through the perforations $h$, in the pipe J. The pipe does not, as will be seen from the above description and an inspection of Fig. 1 of the drawings, revolve with the screen, but it can be turned more or less by hand in order to cause the perforations $h$ to be so disposed as to discharge water on the material where most required, or where the material impinges against the conveyer. The extent to which the valve L will be opened to discharge the material from the cylinder C will, of course, depend largely on the stiffness or refractory condition of the clay or matrix.

The apparatus constructed and arranged as above set forth is very simple, and effectual in the performance of its functions.

Having fully described my invention, what I claim as new, and desire to secure by Letters Patent, is—

The combination with a washer and agitator, of a revoluble screen, a spiral conveyer located within said screen and adapted to be carried thereby, a chute connecting said washer and agitator with the screen, and a perforated pipe passing loosely through the conveyer and through the end of said chute, substantially as set forth.

In testimony whereof I have signed this specification in the presence of two subscribing witnesses.

RUFUS E. ROSE.

Witnesses:
J. E. FOXWORTHY.
J. A. BARBER.